(12) United States Patent
Wren et al.

(10) Patent No.: US 9,454,665 B1
(45) Date of Patent: Sep. 27, 2016

(54) RETRIEVING CONTACT INFORMATION BASED ON IMAGE RECOGNITION SEARCHES

(71) Applicant: Google Inc., Mountain View, CA (US)

(72) Inventors: Christopher Richard Wren, Arlington, MA (US); Nadav Aharony, Cambridge, MA (US)

(73) Assignee: Google Inc., Mountain View, CA (US)

( * ) Notice: Subject to any disclaimer, the term of this patent is extended or adjusted under 35 U.S.C. 154(b) by 81 days.

(21) Appl. No.: 14/336,242

(22) Filed: Jul. 21, 2014

Related U.S. Application Data

(63) Continuation of application No. 13/231,249, filed on Sep. 13, 2011, now Pat. No. 8,818,049.

(60) Provisional application No. 61/487,608, filed on May 18, 2011.

(51) Int. Cl.
| | |
|---|---|
| *G06K 9/00* | (2006.01) |
| *G06F 21/60* | (2013.01) |
| *G06F 21/31* | (2013.01) |
| *G06F 21/62* | (2013.01) |

(52) U.S. Cl.
CPC .............. *G06F 21/60* (2013.01); *G06F 21/31* (2013.01); *G06F 21/6263* (2013.01); *G06K 9/00221* (2013.01); *G06K 9/00268* (2013.01); *G06K 9/00677* (2013.01)

(58) Field of Classification Search
None
See application file for complete search history.

(56) References Cited

U.S. PATENT DOCUMENTS

| | | | |
|---|---|---|---|
| 6,038,333 A * | 3/2000 | Wang | G06K 9/00221 382/118 |
| 6,130,938 A | 10/2000 | Erb | |
| 6,192,119 B1 | 2/2001 | Wilson | |
| 6,542,750 B2 * | 4/2003 | Hendrey | H04W 76/002 455/41.2 |
| 6,697,478 B1 | 2/2004 | Meldrum et al. | |
| 6,754,322 B1 | 6/2004 | Bushnell | |
| 7,106,848 B1 | 9/2006 | Barlow et al. | |
| 7,366,990 B2 | 4/2008 | Pitroda | |
| 7,424,541 B2 | 9/2008 | Bourne | |
| 7,555,110 B2 | 6/2009 | Dolan et al. | |

(Continued)

FOREIGN PATENT DOCUMENTS

| | | |
|---|---|---|
| WO | WO0279984 | 10/2002 |

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Utpal Shah
(74) *Attorney, Agent, or Firm* — Patent Law Works LLP

(57) ABSTRACT

A system and method for retrieving contact information based on image recognition searches is disclosed. A requestor takes a picture of a user or retrieves a storage image of a user and transmits the image to an image recognition module. The image recognition module identifies the user and determines whether the requestor can receive access to the user's contact information based on permission rules. For example, the permission rule includes a requirement that the user and the requestor be sufficiently related on a social graph generated by a social network application. The permission rules can also include a requirement that the requestor have a predetermined proximity to the image. Once the permission rules are satisfied, the image recognition module transmits the user's contact information to the requestor.

21 Claims, 9 Drawing Sheets

(56) References Cited

U.S. PATENT DOCUMENTS

| | | | |
|---|---|---|---|
| 7,610,287 B1 | 10/2009 | Dean et al. | |
| 7,742,468 B2 | 6/2010 | Vagelos | |
| 7,751,805 B2* | 7/2010 | Neven | G06K 9/228 455/3.01 |
| 7,831,069 B2* | 11/2010 | Shah | G06K 9/00268 382/118 |
| 7,970,912 B2* | 6/2011 | Bourne | H04L 12/588 455/414.1 |
| 8,046,411 B2* | 10/2011 | Hayashi | G06F 17/30017 709/204 |
| 8,194,986 B2* | 6/2012 | Conwell | G06F 17/30265 382/224 |
| 8,270,937 B2* | 9/2012 | Evans | H04W 4/04 340/539.19 |
| 8,316,096 B2* | 11/2012 | Svendsen et al. | H04L 51/10 382/118 |
| 8,341,223 B1* | 12/2012 | Patton | G06Q 10/10 455/416 |
| 8,412,780 B2* | 4/2013 | Fox et al. | G06Q 10/00 707/784 |
| 8,417,779 B2* | 4/2013 | Weber | H04W 4/003 345/158 |
| 8,458,363 B2* | 6/2013 | Rosenblatt | G06F 17/30058 709/248 |
| 8,472,874 B2* | 6/2013 | Tang | H04W 8/005 340/5.53 |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2005/0286546 A1* | 12/2005 | Bassoli | G11B 27/002 370/432 |
| 2006/0012677 A1* | 1/2006 | Neven | G06K 68/07 348/61 |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2006/0224675 A1* | 10/2006 | Fox | G06Q 10/00 709/206 |
| 2007/0127631 A1 | 6/2007 | Difiglia | |
| 2007/0171898 A1 | 7/2007 | Salva | |
| 2007/0173236 A1 | 7/2007 | Vishwanathan et al. | |
| 2007/0248077 A1 | 10/2007 | Mahle et al. | |
| 2008/0056475 A1 | 3/2008 | Brannick et al. | |
| 2008/0192656 A1 | 8/2008 | Vagelos | |
| 2008/0201327 A1 | 8/2008 | Seth | |
| 2010/0115114 A1 | 5/2010 | Headley | |
| 2010/0306249 A1* | 12/2010 | Hill | G06F 17/30867 707/769 |
| 2011/0047384 A1* | 2/2011 | Jacobs | G06K 9/00221 713/176 |
| 2011/0052012 A1 | 3/2011 | Bambha et al. | |
| 2011/0098156 A1 | 4/2011 | Ng et al. | |
| 2012/0278176 A1* | 11/2012 | Naor | G06Q 30/0277 705/14.66 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 11, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twittercom/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

(56) References Cited

OTHER PUBLICATIONS

International Search Report and Written Opinion for PCT/US2012/034828, dated Sep. 28, 2012; 9 pages.

Kovach, Steve, "How to: Link Foursquare and GroupMe for Texting Nearby Friends", Business Insider, dated Feb. 18, 2011, 2 pages, http://www.businessinsider.com/how-to-send-a-text-to-your-foursquare-friends-using-groupme-2011-2.

* cited by examiner

349

350

Is the person in the picture:

Claire
351

Jessica
352

Willow
353

No
355

Enter name
357

RETRIEVING CONTACT INFORMATION BASED ON IMAGE RECOGNITION SEARCHES

CROSS REFERENCE TO RELATED APPLICATIONS

This application is a continuation of and claims priority under 35 USC §119(e) to U.S. application Ser. No. 13/231, 249, entitled "Retrieving Contact Information Based on Image Recognition Searches" filed on Sep. 13, 2011, and claims priority to U.S. Application No. 61/487,608, entitled "Retrieving Contact Information Based on Image Recognition Searches" filed May 28, 2011, the entireties of which are herein incorporated by reference.

BACKGROUND

The specification generally relates to providing access to contact information based on image recognition. More specifically, the specification relates to using relationships in a social network to predict the identity of users in images and for determining whether to provide access to contact information.

Before the use of mobile devices became widespread, people used to obtain contact information by exchanging business cards and writing down numbers. Once mobile devices, such as cell phones became more popular people began exchanging numbers by typing them directly into the cell phone. This is time consuming and creates too many possibilities for user error.

One prior art application mimics a first bump by exchanging contact information between two people when their mobile devices touch. Specifically, the mobile devices include an accelerometer that tracks the movement of the mobile devices and compares the signatures of each device to infer an intentional approval to pass contact information from one person to another. In this example, the backend server recognizes that the two mobile devices shake in the same pattern and that the movement is not random and is therefore intended as permission to exchange information. This is a limited solution that requires both people to have mobile devices running the same application and physical contact between the mobile devices.

SUMMARY OF THE INVENTION

In some examples, the technology described in the specification overcomes the deficiencies and limitations of the prior art at least in part by providing a system and method for retrieving contact information based on image recognition searches. A requestor captures an image of a user with a user device. The user device transmits the image to an image recognition module. In one embodiment an image recognition module includes a controller, an image parser, a metadata engine and a graphical user interface module.

The image parser receives the image and identifies the user in the image. In one embodiment the image parser identifies facial features in the image, compares the facial features in the image to facial features of account holders and identifies users based on similarity of facial features.

The controller receives an identification of the user and determines whether permission rules are satisfied and that a requestor has permission to access the contact information. In one embodiment, the controller retrieves a social graph from a social network that includes a relationship between the requestor and the user. In this example the permission rules include a requirement that the requestor and the user satisfy a predetermined relationship on the social graph before the controller transmits the contact information. The contact information includes a name, an email address, a phone number, a home address, a work address, a profile uniform resource locator, a link to establish a relationship with the user on a social network application or an instant messaging handle. In one embodiment, the user device updates an address book with the contact information.

The metadata engine is coupled to the controller and identifies users based on metadata in the image including location, context, time and a social graph. For example, the metadata engine identifies account holders that are within a pre-determined proximity of the location of the image, generates a list of the account holders for displaying to the requestor and receives an identification of the user from the requestor. In another embodiment, the metadata engine generates metadata including a location of the image, a time of capturing the image and an audio sample at the time of capturing the image.

The graphical user interface module generates a user interface for users to identify images with users and tools for identifying users and an account engine for generating user accounts.

The user device captures the image of the user and transmits it to the controller. In one example, the controller transmits the contact information to the user device, which updates an address book with the contact information.

In one embodiment a social network application includes an account engine for generating user accounts, a graphical user interface module for generating and displaying a user interface that displays user information and interactions between friends and a group engine that generates a group responsive to transmitting the contact information to the user. The social network application can be stored on a different server than the image parser and the controller.

The specification also includes a computer program product comprising a non-transitory computer readable medium storing a computer readable program and a number of novel methods including a method for receiving from a requestor an image of at least one user, performing facial recognition, identifying the user in the image, retrieving permission rules associated with the identified user, determining whether the permission rules are satisfied and that the requestor has permission to access the contact information and transmitting the contact information to the requestor.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
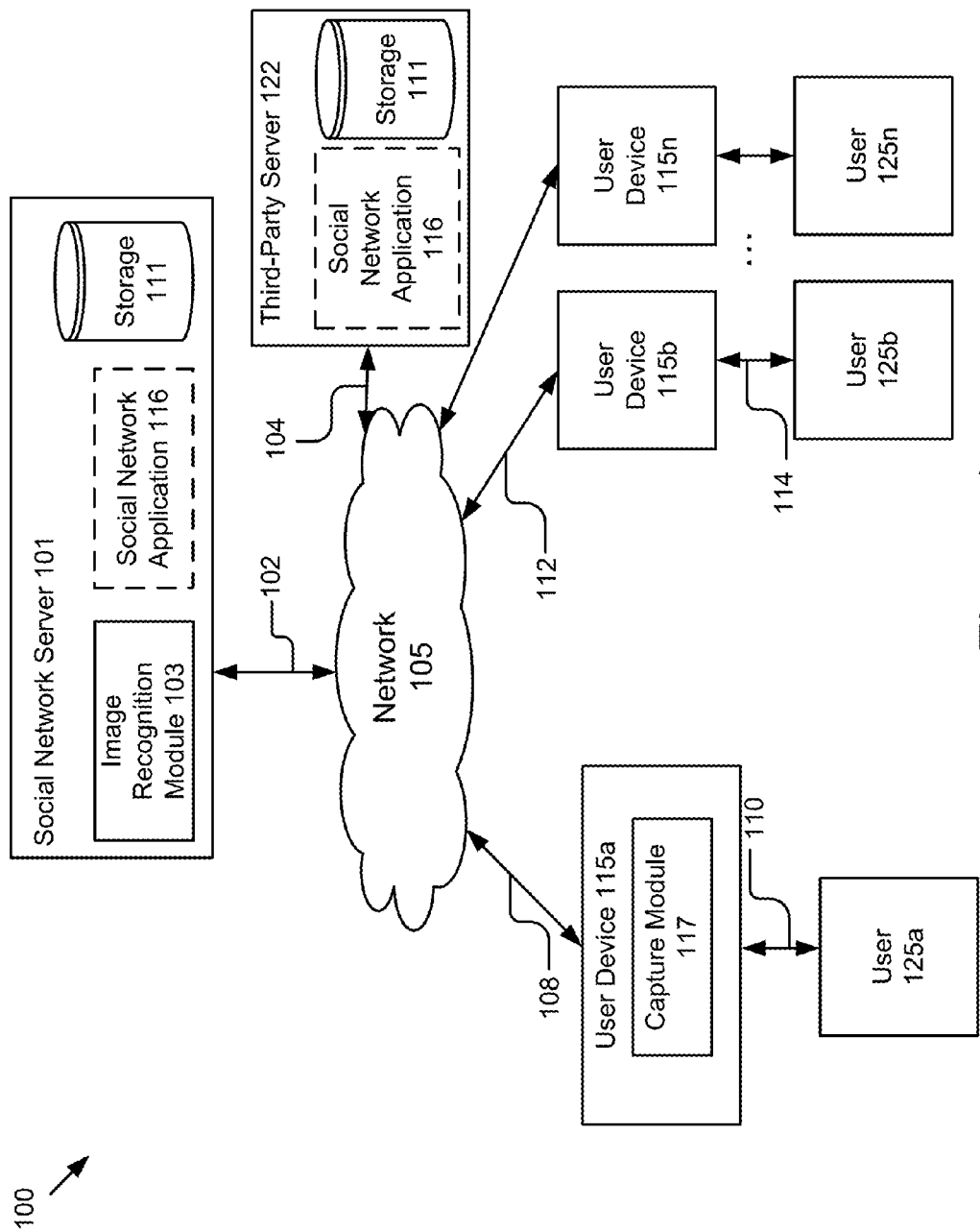
FIG. 1 is a high-level block diagram illustrating a functional view of an image recognition system according to one embodiment.

A system and method for retrieving contact information based on image recognition searches. In the following description, for purposes of explanation, numerous specific details are set forth in order to provide a thorough understanding of the specification. It will be apparent, however, to one skilled in the art that the technology described in the example embodiments can be practiced without these specific details. In other instances, structures and devices are shown in block diagram form in order to avoid obscuring the description. For example, the present embodiment is described in one embodiment below primarily with reference to an image recognition module stored on a server. However, the present embodiment also applies to any type of image recognition module stored on a user device.

Reference in the specification to "one embodiment," "an embodiment" or "an example embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening contact or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

System Overview

FIG. 1 illustrates a block diagram of a system 100 for identifying users from images and transmitting the user's contact information according to an example embodiment.

The illustrated description of a system 100 for identifying users in images includes user devices 115a, 115b . . . 115n, a social network server 101 and a third-party server 122.

The user devices 115a, 115b . . . 115n are accessed by users 125a, 125b . . . 125n via signal lines 110 and 114, respectively. The user devices 115a, 115b . . . 115n access the network 105 via signal lines 108 and 112, respectively. While FIG. 1 illustrates three user devices, the description applies to any system architecture having one or more user devices. Furthermore, while only one network 105 is coupled to the user devices, 115a, 115b . . . 115n, the social network server 101 and the third-party server 122, in practice any number of networks 105 can be connected to the entities.

The user device 115a is any computing device that is capable of connecting to a network, e.g. a personal computer, a laptop, a cell phone, a camera phone, a smart phone, a personal digital assistant, a media player, a navigation device, an email device, a game console, a tablet or a combination of any of these devices. In one embodiment, the user device 115a includes a capture module 117 for capturing images of a user and transmitting the images to the social network server 101 for image recognition processing. In some examples, the user opts-in to the image recognition processing before facial recognition is performed. In another embodiment, the image is stored on the user device 115 and is transmitted to the social network server 101 for image recognition processing. In one embodiment the user device 115 also includes tools for identifying users in conjunction with social network application information.

The social network server 101 returns contact information, such as the user's cell phone number subject to the user providing permission for the contact information to be disseminated. In some examples, permission to access other information specified by the user (e.g. relationship status, etc.) or access to documents (e.g., photo albums, etc.) may be provided. For example, a requestor 125a takes a picture of a user in a bar with the user device 115a, which includes a camera. The capture module 117 transmits the captured image to the image recognition module 103, which identifies the user and transmits the user's contact information to the requestor.

In one embodiment the social network server 101 includes an image recognition module 103, a social network application 116 and storage 111. The image recognition module 103 receives images from a requestor's user device 115a, 115b . . . 115n. The image recognition module 103 performs feature recognition on the image to identify the user in the image if the user has opted-in to the service. The image recognition module 103 retrieves user information from storage 111 including the user's contact information and permission rules for who can receive what information. If the requestor satisfies the permission rules, the image recognition module 103 transmits the contact information to the requestor's user device 115a, 115b . . . 115n.

The social network application 116 is software and routines for generating a social network. A social network is any type of social structure where the users are connected by a common feature, for example, Google Plus. The common feature includes friendship, family, work, an interest, etc. The common features are provided by one or more social networking systems, such as those included in the system 100, including explicitly-defined relationships and relationships implied by social connections with other users, where the relationships are defined in a social graph. The social graph is a mapping of all users in a social network and how they are related to each other.

The social network application 116 generates user information that is used in conjunction with the image recognition module 103. For example, the user's permissions for transmitting contact information allow dissemination of contact information if the user is within two degrees of separation from the person that submitted the image, i.e. a friend of a friend. This is determined by retrieving a social graph that includes the requestor and the user in the image by mapping their relationship within the social graph. Responsive to satisfying the conditions for disseminating contact information, the social network server 101 transmits the contact information to the user device 115a, 115b . . . 115n via signal line 102. In one embodiment, the image recognition module 103 and the social network application 116 are combined into a single module.

In another embodiment, the social network application 116 is stored on a third-party server 122 along with storage 111 that includes user information including a social graph. In this example, the third-party social network server 101 hosts the social network application 116. The image recognition module 103 stored on the social network server 101 requests user information from the social network application 116. The social network application 116 confirms that the user authorized the transmission of user information, retrieves the information from storage 111 and transmits the requested information to the image recognition module 103 via signal line 104. While only one third-party server 122 is shown, the system 100 could include one or more third-party servers 122.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. In an example embodiment, the network 105 includes Bluetooth® communication networks or a cellular communications network for sending and receiving data such as via short messaging service (SMS), multimedia messaging service (MMS), hypertext transfer protocol (HTTP), direct data connection, WAP, email, etc.

User Device 115

Figure 2A:
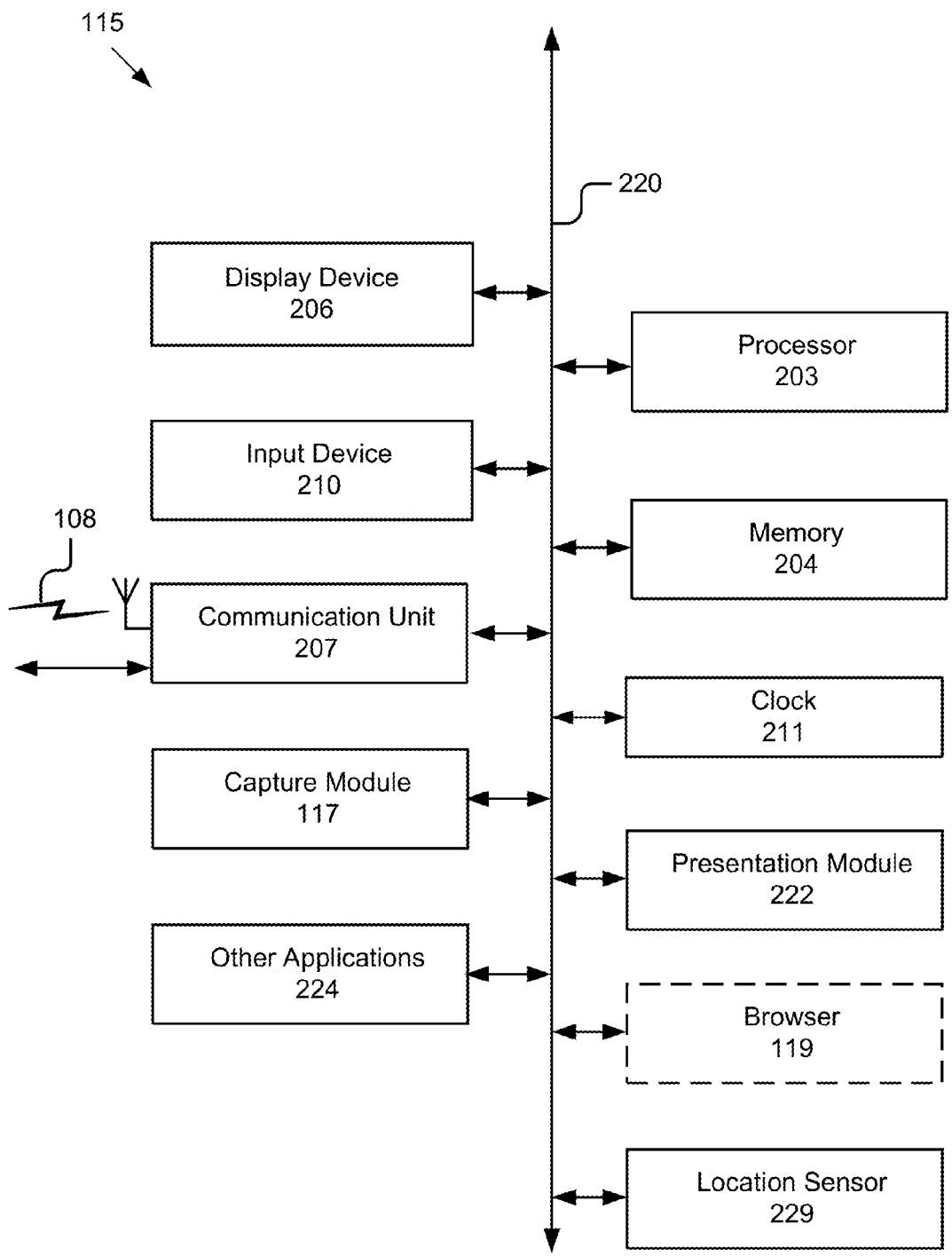
FIG. 2A is a block diagram illustrating a user device according to one embodiment.

Referring now to FIG. 2A, the components of a user device 115 are described. The user device 115 includes a processor 203, a memory 204, a display device 206, a communication unit 207, an input device 210, a clock 211, a presentation module 222, a capture module 117, optionally a browser 119 and other applications 224.

The processor 203 comprises an arithmetic logic unit, a microprocessor, a general purpose controller or some other processor array to perform computations, provide electronic display signals to display device 206, and detect and process inputs. The processor 203 is coupled to the bus 220 for communication with the other components of the user device 115. Processor 203 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability of the user device 115 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The user device 115 also includes an operating system executable by the processor 203 such as but not limited to WINDOWS®, MacOS X, Android, iOS, Android, BlackberryOS or UNIX® based operating systems.

The memory 204 stores instructions and/or data that may be executed by processor 203. The instructions and/or data may comprise code for performing any and/or all of the techniques described herein. The memory 204 may be a dynamic random access memory (DRAM) device, a static random access memory (SRAM) device, flash memory or some other memory device known in the art. In one embodiment, the memory 204 also includes a non-volatile memory such as a hard disk drive or flash drive for storing log information on a more permanent basis. The memory 204 is coupled by the bus 220 for communication with the other components of the user device 115.

The communication unit 207 is coupled to an antenna and the bus 220. An alternate embodiment, the communication unit 207 may provide a port for direct physical connection to the network 105. The communication unit 207 includes a transceiver for sending and receiving compound documents. In one embodiment, the communication unit 207 includes a Wi-Fi transceiver for wireless communication with an access point. In another embodiment, the communication unit 207 includes a Bluetooth® transceiver for wireless communication with other devices. In yet another embodiment, the communication unit 207 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 207 includes ports for wired connectivity such as but not limited to USB, SD, or CAT-5, etc. The communication unit 207 links the processor 203 to the network 105 that may include multiple processing systems. The network of processing systems may comprise a local area network (LAN), a wide area network (WAN) (e.g., the Internet), and/or any other interconnected data path across which multiple devices may communicate. The communication unit 207 also provides other conventional connections to the network 105 for distribution of files (media objects) using standard network protocols such as TCP/IP, HTTP, SSH, git HTTPS and SMTP as will be understood to those skilled in the art.

The input device 210 includes a device for receiving input, such as a camera. The input device 210 can also include a keyboard and a mouse type controller. The input device 210 is coupled to the browser 119, the capture module 117, the processor 203 and the memory 204. In response to a request from the capture module 117 or the browser 119, the input device 210 transmits the captured image to the capture module 117 or the browser 119.

The clock 211 is a conventional type and provides an indication of local time for the user device 115. In particular, the clock 211 is used to provide a local time at which images are processed. The clock 211 is adapted to communicate this information to the processor 203 using the system bus 220.

The capture module 117 is software and routines for receiving an image from the input device 210 or an image stored in memory 204 and transmitting the image by communication unit 207 to the social network server 101 for processing. In one embodiment, the capture module 117 is a routine executable by the processor 203 for displaying a graphical user interface (GUI) on the display device 206. The GUI includes tools for locating the image and, in one embodiment, tools for identifying the user in the image. One type of tool for identifying the user in the image is commonly referred to as "tagging." In another embodiment, the capture module 117 is a browser 119 plug-in.

The browser 119 is code and routines stored in the memory 204 and executed by the processor 203 of the user device 115 for displaying websites on the display device 206, and adjusting the display of the website in response to input from the input device 210 or a user. For example, the browser 119 is a browser application such as Google Chrome. In one embodiment the browser 119 retrieves images from the input device 210 for transmission to the social network server 101. In another embodiment, the browser 119 retrieves images from the memory 204 or a remote storage location, such as images stored over the network 105. The browser 119 transmits the images directly to the social network server 101, or in one embodiment, the browser 119 displays tools for identifying users in images. If the browser 119 transmits an image that was taken by the input device 210, in one embodiment the browser 119 also transmits a location of the image. For example, the browser 119 provides the location based on the user device's 115 internet protocol address. In one embodiment, the browser 119 works in conjunction with the capture module 117 to retrieve images and display information.

The location sensor 229 is software and routines for identifying the location of the user device 115. The location sensor 229 is coupled to the communication unit 207 and determines, based on the type of hardware being used by the communication unit 207 the location of the user device 115. For example, the location sensor 229 determines the user device's 115 location based on global positioning system (GPS) data received from GPS satellites. Alternatively, the location sensor 229 receives information from cell towers that provide a triangulation mechanism. In yet another embodiment, the location sensor 229 receives signal strength measurements from known locations of WiFi access points or Bluetooth® devices.

In one embodiment, the capture module 117 receives the location of the user device 115 and, if the image is captured with the user device 115, associates the location with the image. The location of the image is used by the social network server 101 to help narrow down the list of potential people in the image. For example, if the image was captured in New York City it is more likely to be associated with a user that was identified as being in New York around the same time that the image was captured than a user identified as being in California around the same time that the image was captured. The location sensor 229 is coupled to the capture device 117, the processor 203 and the memory 204.

The other applications 224 include other software and routines executable by the processor 203 for various other types of functionality. In one embodiment, one or more application programs are executed by the processor 203 including, without limitation, image processing applications and electronic mail applications.

Social Network Server 101

Figure 2B:
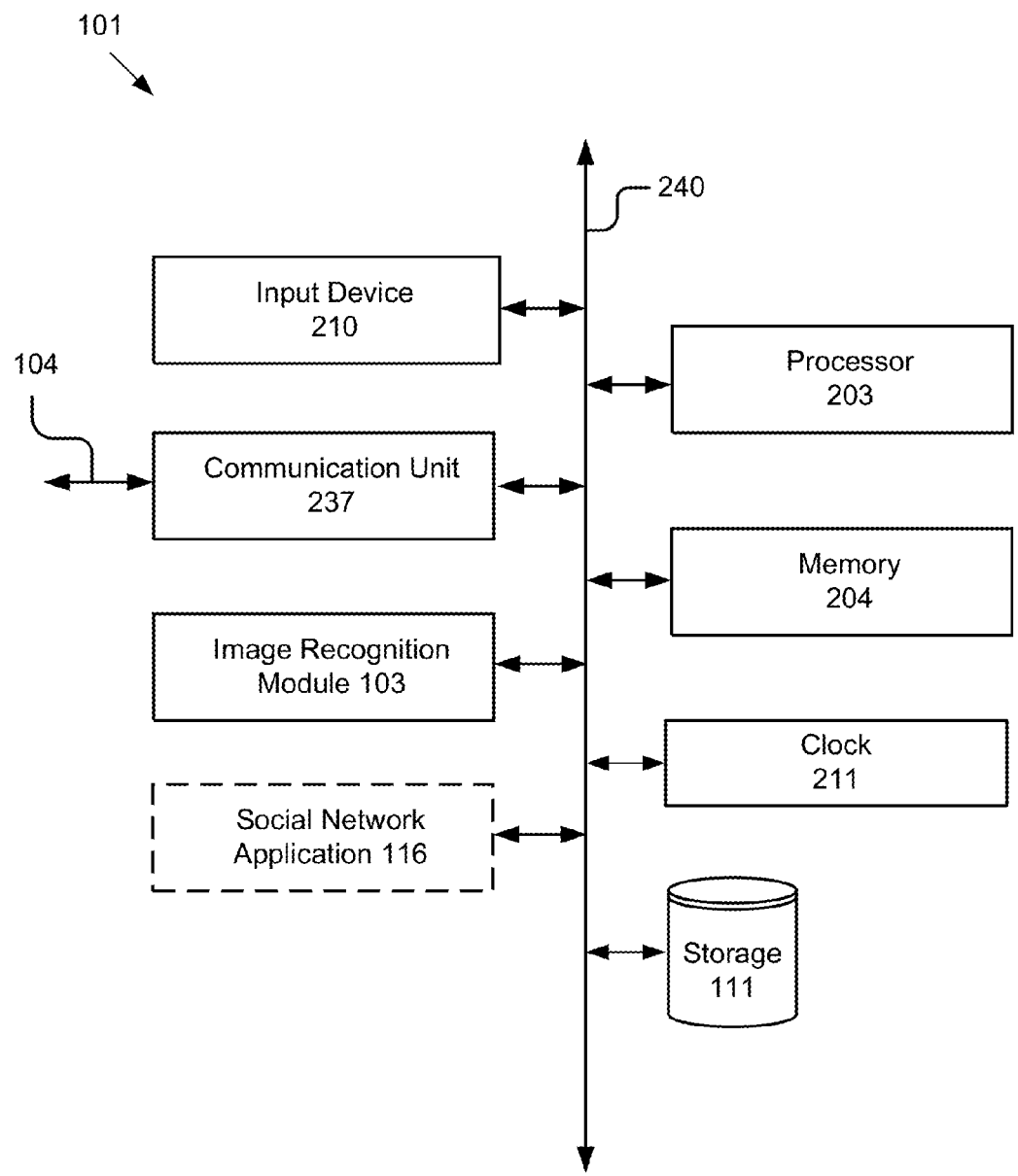
FIG. 2B is a block diagram illustrating a server according to one embodiment.

Referring now to FIG. 2B, the social network server 101 comprises a processor 203, a memory 204, a communication unit 237, an image recognition module 103, a clock 211, storage 111 and optionally a social network application 116 coupled to the bus 240.

Those skilled in the art will recognize that some of the components of the social network server 101 have the same or similar functionality to the components of the user device 115 so descriptions of these components will not be repeated here. For example, the processor 203, the memory 204, the communication unit 237 and the clock 211 have a similar functionality to the processor 203, the memory 204, the communication unit 207 and the clock 211 of FIG. 2A, respectively.

The image recognition module 103 is software including routines for performing facial recognition, generating tools for tagging users in images, generating a user interface for submitting images and receiving contact information and transmitting contact information to a requestor. In one embodiment, the image recognition module 103 is a set of routines executable by the processor 203 to store user information including permissions in the memory 204 or the storage 111, determining whether a requestor can receive a user's contact information based on the image and the relationship between the user and the requestor and for transmitting the contact data to the requestor. The image recognition module 103 is coupled by the bus 240 to the processor 203, the memory 204, the communication unit 237, the input device 210 and the storage 111.

In one embodiment, the social network server 101 includes a social network application 116. In the most basic example, the social network application 116 creates associations between users and generates a user interface for exchanging information between related people (hereinafter referred to as "friends"). In a more complicated example, the social network application 116 generates groups within the social network that are focused on specific topics, such as work, entertainment, pets, politics, etc. The social network application 116 tracks relationships between users in the form of a social graph. When the social network application 116 is part of the social network server 101, the social graph is stored in storage 111 or memory 204. When the social network application 116 is stored on a separate third-party server 122, the social graph is maintained on the third-party server's 122 storage 111 and is transmitted upon request or changes to the social graph are automatically transmitted to the social network server 101, which maintains its own copy of the social graph. The social network application 116 is coupled to the processor 203, the memory 204 and the storage 111.

In one embodiment, the user information is stored in storage 111. In another embodiment, the user information is stored in memory 204. With regard to the image recognition module 103, the user information includes account information, such as a username and password; contact information, such as a name, address, phone number, email address; and permission for transmitting data. With regard to the social network application 116, the user information includes account information, a social graph that tracks the relationships between users, user activity, etc. The storage 111 is coupled to the image recognition module 103, the social network application 116, the processor 203 and the memory 204.

Image Recognition Module 103

Figure 3A:
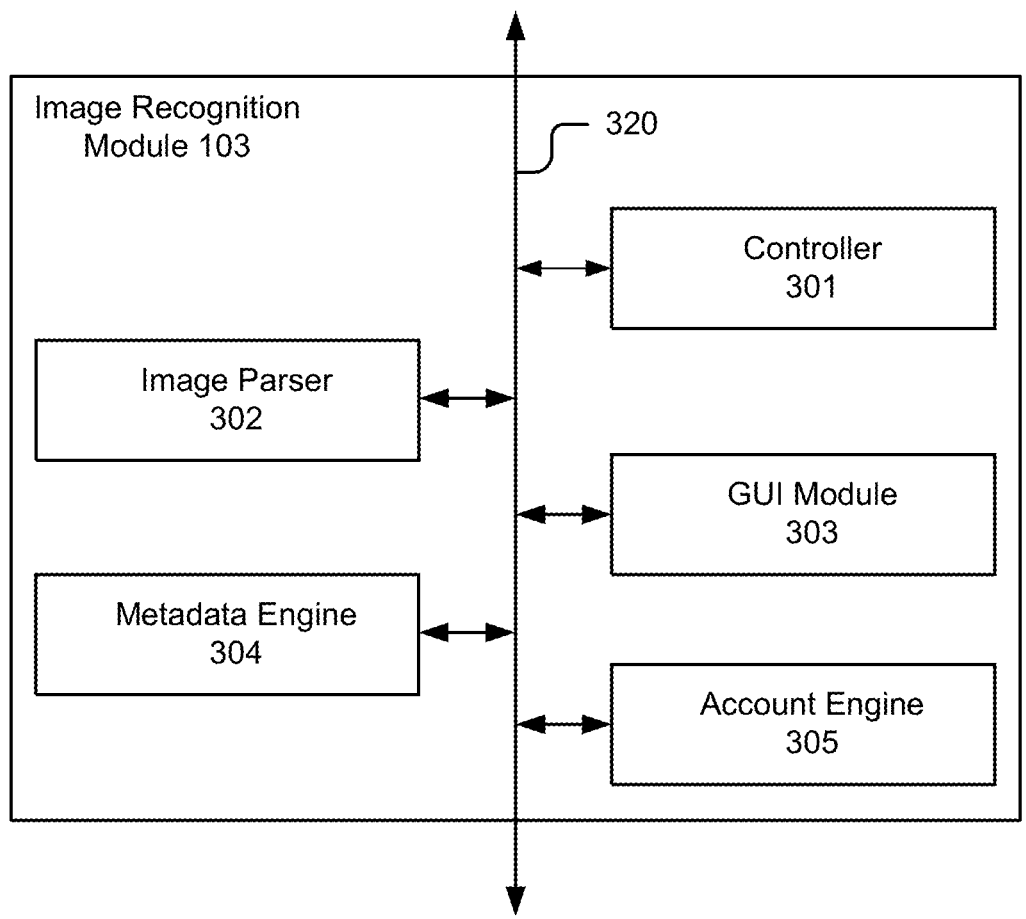
FIG. 3A is a block diagram illustrating a detailed embodiment of an image recognition module.

Turning now to FIG. 3a, an image recognition module 103 comprises a controller 301, an image parser 302, a graphical user interface (GUI) module 303, a metadata engine 304 and an account engine 305 that are coupled to the bus 320.

The controller 301 is code and routines for controlling the input and output of information within the image recognition module 103. In one embodiment, the controller 301 is a set of routines executable by the processor 203 to receive an image from a user device 115, transmit the image to the image parser 302 for identification of the image components and the user (subject to the user's consent), transmit the image to the metadata engine 304 for narrowing the scope of potential users in the image based on metadata such as a social graph, context or a location, audio sample and a time of capturing the image and for transmitting information to the GUI module 303 for generating a user interface to display the information. The controller 301 also transmits the user interface to a user device 115 via the communication unit 237. In one embodiment, the controller 301 transmits the information to a third-party application, such as a photo-sharing application.

Once the image parser 302 or the metadata engine 304 identifies the user in the image, the controller 301 extracts the permissions from the storage 111 or memory 204 associated with the identified user and determines whether the requestor that submitted the image has permission to receive the user's contact information. In one embodiment, the controller 301 requests explicit authorization from the user before sending contact information each time a requestor submits a request. In another embodiment, the user provides blanket permission for anyone to receive the data. In this example, the user may only authorize transmission of certain types of information such as an email address because anyone could take a picture of the user and request contact information.

In one embodiment, the permission has different levels including: (1) a request for confirmation from the user; (2) a limitation on proximity of the requestor to the user; (3) time of taking the image; (4) a comparison of the audio samples for both the requestor and the user; (5) a requirement that both the requestor and the user take images of each other to prove the authenticity of the requestor; and (6) a relationship on a social graph. With regard to the first example involving a request for confirmation, the controller 301 provides the user's contact information to the requestor responsive to sending a request for confirmation to the user and receiving the user's confirmation. For the second example involving proximity of the requestor to the user, the user device 115 transmits location information that is received by the controller 301 and compared to the user's location. The user device 115 tracks the user's location and transmits the location periodically or in response to a request from the controller 301, the controller 301 compares the two locations and as long as they are within a predetermined threshold, the controller 301 transmits the contact information to the requestor. For the third example involving time, the controller 301 receives an image and a time of capturing the image as designated by the clock 211. This can be an additional level of security added on to the previous example where the controller 301 determines that the user and the requestor were both in the same location around the same time in the same context. For the fourth example involving audio samples, the requestor's user device 115 takes an audio sample at or around the same time as it captures the image. The user's user device 115 takes periodic samples or takes a sample in response to a request for contact information. The controller 301 compares both samples to determine whether the requestor and the user were in the same area at the time the image was taken. This could be an additional level of security or a stand-alone authentication feature. For the fifth example both the requestor and the user taking images of each other, the images are transmitted to the controller 301, identified, and contact information for both the user and the requestor are transmitted to the requestor and the user, respectively. For the sixth example, the controller 301 retrieves the social graph associated with the social network application 116 and, based on the user's permission, determines whether the user is sufficiently related to the requestor to receive the user's contact information. For example, if the permission requires a second-degree relationship between the user and the requestor, the user and the requestor must share a friend in common.

The image parser 302 is code and routines for receiving the image from the controller 301 and parsing the image into image components to aid in identifying the user in the image. In one embodiment, the image parser 302 is a set of routines executable by the processor 203 to receive an image from the controller 301 and to extract landmarks from the image of the user (or users). For example, the image parser 302 quantifies the relative position, size and shape of the eyes, nose, cheekbones and jaw. The image parser 302 retrieves from storage 111 landmarks of users that match the extracted users and compares the results to narrow down the potential matches. The image parser 302 transmits the matching user to the controller 301.

If the image parser 302 obtains multiple potential users that match the image, the controller 301 transmits the results to the metadata engine 304 for further analysis. The metadata engine 304 is code and routines for extracting metadata from an image and identifying a user in the image based on the metadata. Specifically, the image contains metadata about the location, context and time at which the image was captured. In one embodiment, the context metadata includes an activity that is occurring in the image, such as a leisure activity like being at the beach, a part, a sport event or a work-related event like a conference. The metadata engine 304 retrieves information about the potential users from storage 111 or memory 204 including information obtained from the social network application 116 (subject to the users' permission) and narrows the potential results by eliminating users that are outside the location, context and time constraints.

For example, the image was captured in Chicago, Ill. on Jan. 1, 2011 at 5:00 p.m. There are three users with facial features that match the features identified in the image. User A tagged herself at a coffee shop in Chicago, Ill. at 4:13 p.m. on Jan. 1, 2011. User B lives in Minnesota and has no information about recent whereabouts. User C lives in California and tagged herself at home at 8:34 p.m. on Jan. 1, 2011. The metadata engine 304 discards User B because it is unlikely that User B was in Chicago on Jan. 1, 2011. The metadata engine 304 discards User C because she could not have been in Chicago on Jan. 1, 2011. As a result, User A is the user identified in the image. The metadata engine 304 transmits the identification of User A to the controller 301.

In addition to location, context and time, the metadata engine 304 also narrows down the number of potential users by retrieving a social graph from storage 111 that was generated by the social network application 116. The metadata engine 304 applies a higher weight to users that are more closely related to the requestor. For example, a requestor is more likely to be requesting information about a user that is a friend of a friend than a user that is separated by five degrees. The metadata engine 304 assigns a weight to these factors instead of simply discarding the unrelated users because it is also possible that the requestor met someone completely unrelated to the requestor's other friends.

The GUI module 303 is code and routines for generating a user interface that is displayed on the user device 115. In one embodiment, the GUI module 303 is a set of routines executable by the processor 203 for generating a user interface that displays tools for registering, for establishing permissions about when contact information is shared and for the requestor to identify an image that contains a user for which the requestor wants contact information. In another embodiment, the GUI module 303 generates a field where the requestor inputs a URL of a webpage that contains an image with users for which the request would like the contact information. The same rules regarding permission and relatedness on the social graph apply to this example as well. In another embodiment, the GUI module 303 generates information for sharing the contact information or the picture with a third-party website, for example, by populating the "To:" field of an email message with the contact information and attaching the image to the email.

In another embodiment, the GUI module 303 also generates tools for a requestor to identify the user in the picture. The GUI module 303 may offer this option if the potential users are closely related on a social graph. In another embodiment, the metadata engine 304 makes a prediction about the users based on metadata before the image parser 302 extracts features from the image and the predictions are displayed by the GUI module 303. This alternative is advantageous in situations where the image parser 302 takes too long to extract features from the image.

Figure 3B:
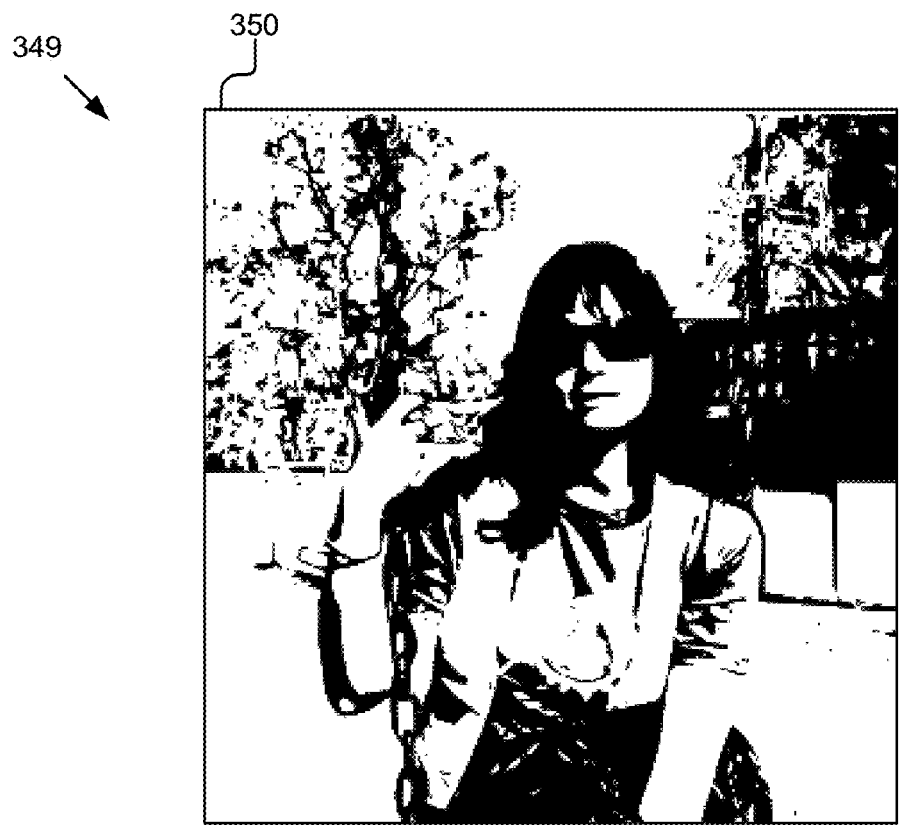
FIG. 3B is a graphical representation of an example for presenting a requestor with potential users based on suggestions generated using a social graph according to one embodiment.
Figure 3B:
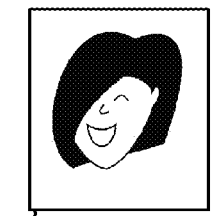
Figure 3B:
Figure 3B:
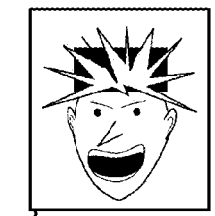

FIG. 3B is an illustration of one example 349 generated by the GUI module 303 and presented to the requestor for identifying the user in the image 350. In this example, the image 350 includes a woman with sunglasses over her eyes, which makes image parsing more difficult because the image parser cannot use data about the eyes as a discriminator. The metadata engine 304 extracts information about the time and location of the picture and retrieves profile information from storage 111 or memory 204 about potential users and their relatedness to the requestor. In one embodiment, the metadata engine 304 selects potential users within a predetermined proximity to the image. The potential users are displayed below the image 350.

In this example, the GUI module 303 displays Claire's image 351 because her hair is similar to the hair in the image 350. The GUI module 303 displays Jessica's image 352 because she was located close to the location of the image 350 at the time the image was taken. The GUI module 303 displays Willow's image 353 because she and the requestor share a friend in common. If none of the potential users match the image, the requestor selects the "no" icon 355. The GUI module 303 receives the rejection and a new set of potential users is generated by, for example, the image parser 302 performing extraction of features of the image.

In one embodiment, the GUI module 303 also generates a text bar 357 where the requestor enters the name of the user in the image. The requestor begins entering letters into the text bar 357 and the GUI module 303 displays a list of potential users based on the accounts of users for the image recognition module 103 or the social network application 116. If the user enters a name that does not match the name of any user account, in one embodiment the GUI module 303 generates a form for the user to enter the email address of the user to invite the user to join the application.

Figure 3C:
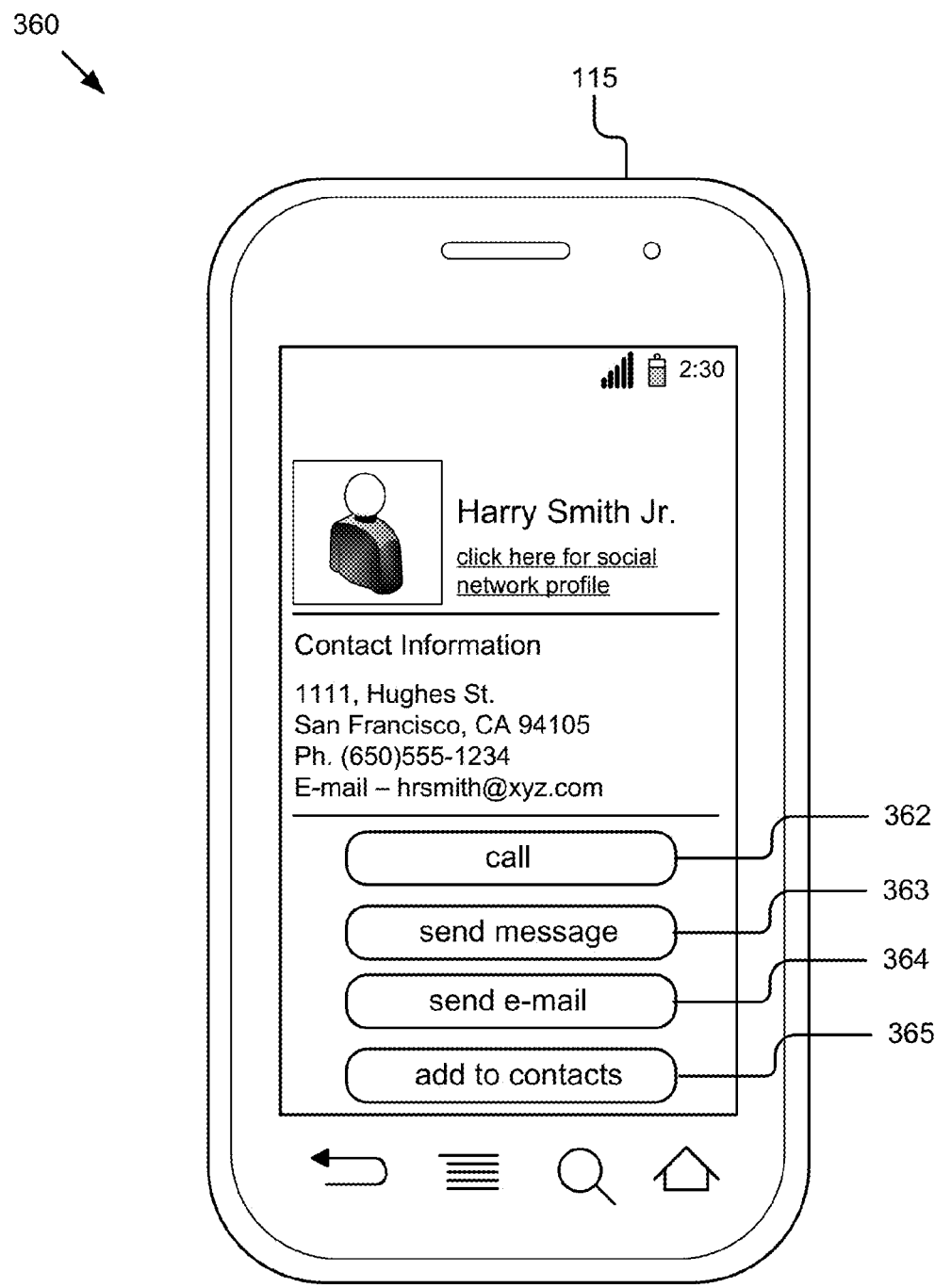
FIG. 3C is a graphical representation of an example of contact data of a user identified in an image that is displayed on a requestor's user device.

Once the user is identified and the controller 301 determines whether the permission requirements are satisfied, the GUI module 303 generates a display of the contact information that is transmitted to the requestor. FIG. 3C is an example 360 of contact information that is displayed on a user device 115. In this example, the contact information includes the name, a home address, a phone number and an email address of the user. The contact information can also include a work address, a profile URL (i.e. a webpage about a user), a link to establish a relationship with the user on a social network application (e.g. an invitation to friend the user) and an instant messaging handle. As mentioned above, the transmission of all this information is authorized by the user. In one embodiment, the image recognition module 103 is connected to other applications on the user device 115 such that the contact information can be transmitted to a phone application (call icon 362), a messaging application such as a short messaging service (SMS) (send message icon 363), an email application (send e-mail icon 364) or an address book (add to contacts icon 367). In one embodiment, the user device 115 updates the requestor's address book with the contact information.

Turning back to FIG. 3A, the account engine 305 is code and routines for generating an account for each user. In one embodiment, the GUI module 304 generates a display for displaying registration information on the user device 115 including permission to perform facial recognition on an image and permissions for transmitting contact information. The controller 301 transfers the registration information to the account engine 305, which generates an account for the user that contains a unique identifier and stores the user's contact information and permissions in storage 111 or memory 204.

Social Network Application 116

Figure 4:
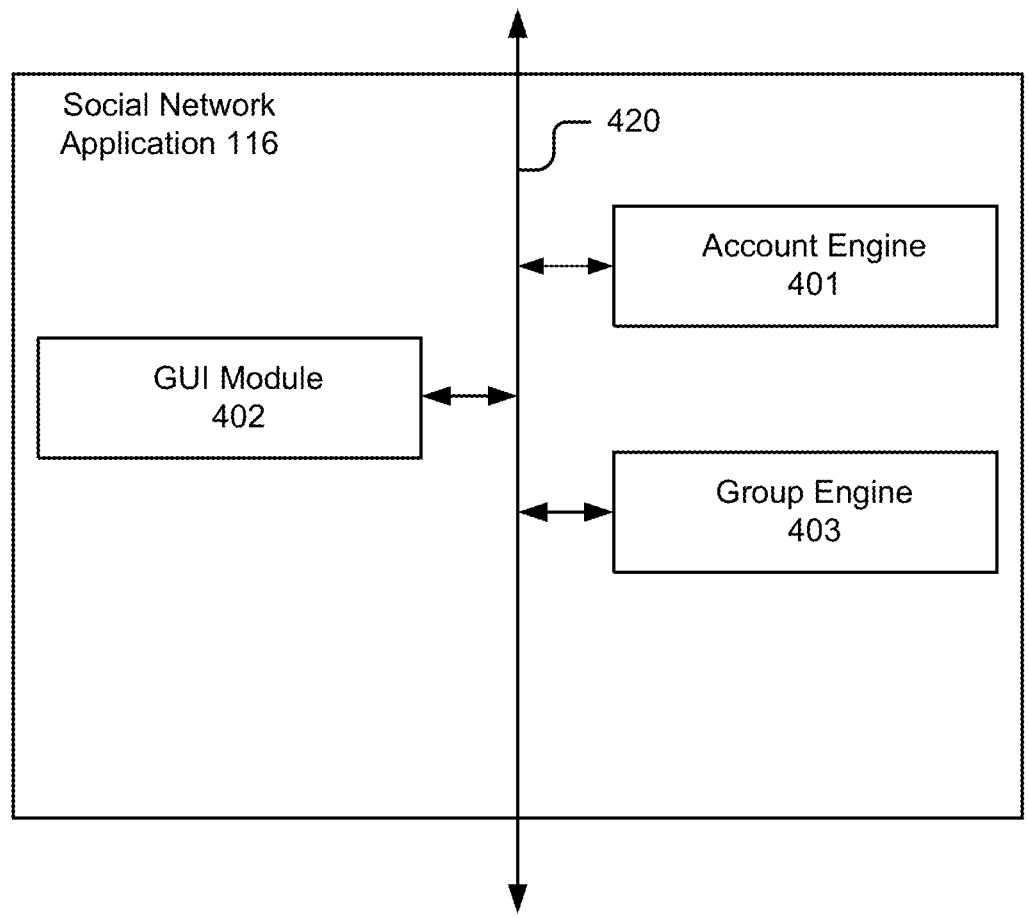
FIG. 4 is a block diagram illustrating an example of a social network application.

Turning now to FIG. 4, in one embodiment the social network application 116 comprises an account engine 401, a GUI module 402 and a group engine 403 that are coupled to a bus 420. In one embodiment, the social network application 116 is stored on the social network server 101 along with the image recognition module 103. In another embodiment, the social network application 116 is stored on a third-party server 112. The social network application 116 is communicatively coupled to storage 111 or memory 204 that is shared or accessed by the image recognition module 103 as well.

The account engine 401 is code and routine for generating user accounts and a social graph for the social network application 116 in response to receiving information from the GUI module 402. In one embodiment, the user account is the same as the user account for the image recognition module 103. In another embodiment, the account engine 401 maintains a separate account and only shares the social graph with the image recognition module 103. The account engine 401 stores the account information in memory 204 or storage 111.

The GUI module 402 is code and routines for generating a user interface for the user on a user device 115. The user interface is used to register the user, display information about the user and the user's friends and exchange information such as status updates, photos, links to articles or websites, documents, etc.

The group engine 403 is code and routines for generating a group with a theme. In one embodiment, after a user in an image is identified, identifiers for the user and the requestor are transmitted to the group engine 403, which generates a group that includes the requestor and the user. As with all other examples in the application, this applies to images that include multiple users.

The group feature is a convenient way to generate a place on a social network where people can have discussions. For example, a requestor takes a picture of users at a conference. The group engine 403 generates a group and the group becomes a place where people can discuss different events relating to the conference. Users discuss presentations that they want to attend, email all members of the group and they share pictures of things that happened at the event. In addition, if a user has trouble remembering the name of someone at the conference, the group includes a member list where people review pictures and names of everyone in the group, which makes remembering names much easier.

Methods

Figure 5:
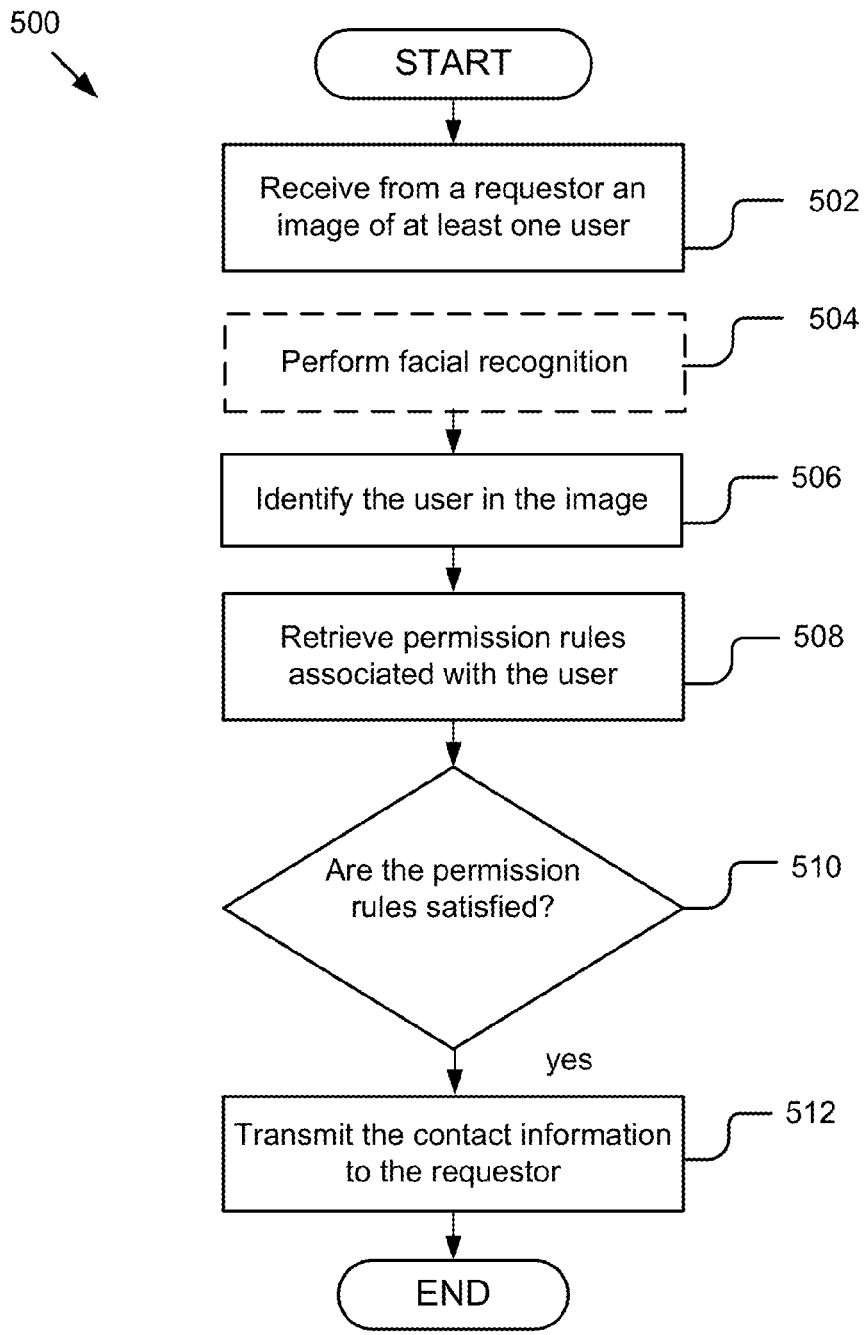
FIG. 5 is a flow diagram of a method for identifying a user in an image and transmitting contact information to a requestor according to one embodiment.
Figure 6:
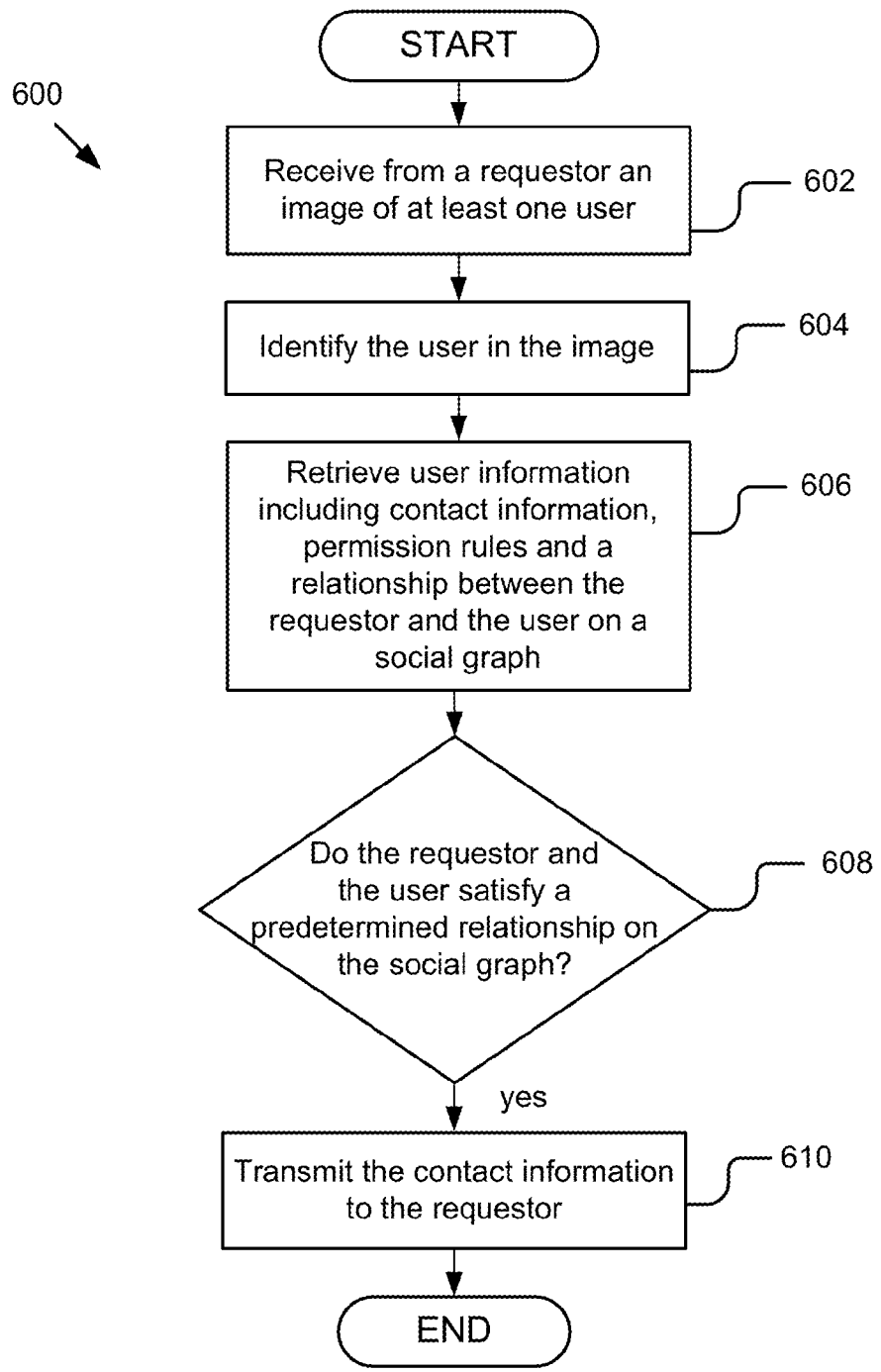
FIG. 6 is a flow diagram of a method for identifying a user in an image and transmitting contact information to a requestor based on the relationship between the user and the requestor in a social graph according to one embodiment.

Referring now to FIGS. 5 and 6, various example embodiments will be described.

FIG. 5 is a flow diagram of a method 500 for identifying a user in an image and transmitting contact information to a requestor according to one embodiment. The image recognition module 103 receives 502 from a requestor an image of at least one user. Both the requestor and the user hold accounts with the image recognition module 103. In one embodiment, the image recognition module 103 includes an image parser 302 that performs 504 facial recognition, for example, by identifying facial features in the image and comparing the facial features with those of other account holders to identify a match. The facial features are stored in memory 304 or storage 111. The image recognition module 103 identifies 506 the user in the image. In one embodiment, the identification is based on the facial recognition features and metadata including a location and a time during which the image was taken. In another embodiment, the image recognition module 103 includes a GUI module 303 that transmits a list of potential users to the requestor to narrow down the list. In yet another embodiment, the GUI module 303 also generates a user interface where the user can specify the identity of the user in the image.

The image recognition module 103 includes a controller 301 that retrieves permission rules associated with the user. The controller 301 determines 510 whether the permission rules are satisfied. If the permission rules are not satisfied, the contact information is not transmitted. In one embodiment, the controller 301 transmits a notification to the requestor, such as a refusal to transmit the contact information because the requestor does not have authorization to receive the contact data.

In one embodiment, the permission rules include determining whether the requestor and the user were in the same or similar location, whether the image was taken at a time when the user would have been at that location, whether the requestor and the user have comparable audio samples and whether the requestor and the user share friends in common according to a social graph. In one embodiment, the user must explicitly approve dissemination of the user's contact information. In another embodiment, both the requestor and the user take pictures of each other as a way to verify the authenticity of the images. Responsive to the permission rules being satisfied, the controller 301 transmits 512 the contact information to the requestor. If the permission rules are not satisfied, the controller 301 does not transmit the contact information to the requestor. In one embodiment, the GUI module 303 generates a notification explaining that permission was denied.

FIG. 6 is a flow diagram of a method for identifying a user in an image and transmitting contact information to a requestor based on the relationship between the user and the requestor in a social graph according to one embodiment. The image recognition module 103 receives 602 from a requestor an image of at least one user. The image recognition module 103 identifies 604 the user in the image using various methods described above in conjunction with FIG. 3A and FIG. 5.

The image recognition module 103 includes a controller 301 that retrieves 606 user information including contact information, permission rules and a relationship between the requestor and the user on a social graph. The social graph is generated by a social network application 116. In one embodiment the image recognition module 103 and the social network application 116 are on the same social network server 101. In another embodiment the image recognition module 103 is stored on a separate server from the social network application 116. The social graph is stored in memory 304 or storage 111.

The controller 301 determines 608 based on permission rules whether the requestor and the user satisfy a predetermined relationship on the social graph for the requestor to receive the contact information. For example, the controller 301 will not transmit contact information to a requestor that is three degrees away from the user when the permission rules require a two-degree separation. Responsive to the requestor and the user being sufficiently related, the controller 301 transmits the contact information to the requestor. In one embodiment, the social network application 116 also generates a group on the social network that contains the user and the requestor.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method for transmitting contact information to a requestor comprising:
   receiving, by one or more processors, from the requestor an image of a user, the image associated with a location;
   identifying, by the one or more processors, the user in the image based on features in the image and the location associated with the image;
   retrieving, by the one or more processors, permission rules associated with the identified user, the permission rules indicating a predetermined threshold of proximity between a location of the user and a location of the requestor to be satisfied before the contact information is transmitted;
   determining, by the one or more processor, whether the permission rules are satisfied and that the requestor has permission to access the contact information; and
   responsive to satisfying the permission rules, transmitting, by the one or more processors, the contact information to the requestor.

2. The method of claim 1, wherein the requestor captures an image of the user with a user device.

3. The method of claim 1, comprising retrieving a social graph from a social network that includes a relationship between the requestor and the user and wherein the permission rules include a requirement that the requestor and the user satisfy a predetermined relationship on the social graph.

4. The method of claim 1, wherein identifying the user in the image comprises:
   identifying facial features in the image;
   comparing the facial features in the image to facial features of account holders; and
   identifying users based on similarity of facial features.

5. The method of claim 1, wherein identifying the user in the image comprises:
   identifying account holders that are within a pre-determined proximity of the location of the image;
   generating a list of the account holders for displaying to the requestor; and
   receiving an identification of the user from the requestor.

6. The method of claim 1, wherein identifying the user in the image comprises receiving an identification of the user from the requestor.

7. The method of claim 1, comprising capturing the image of the user on a user device.

8. The method of claim 7, comprising generating metadata for the captured image, the metadata including at least one of the location of the image, a context of the image, a time of capturing the image and an audio sample at the time of capturing the image.

9. The method of claim 1, wherein the contact information includes at least one of a name, an email address, a phone number, a home address, a work address, a profile uniform resource locator, a link to establish a relationship with the user on a social network application and an instant messaging handle.

10. The method of claim 1, comprising updating an address book with the contact information.

11. A system comprising:
   one or more processors;
   an image parser, stored on a memory and executable by the one or more processors, the image parser configured to identify a user in an image; and
   a controller, stored on a memory, executable by the one or more processors, and coupled to the image parser, the controller configured to:
      receive an image of at least one user, the image associated with a location;
      transmit the image to the image parser;
      receive an identification of the user from the image parser based on features in the image and the location associated with the image;
      retrieve permission rules associated with the identified user, the permission rules indicating a predetermined threshold of proximity between a location of the user and a location of a requestor to be satisfied before the contact information is transmitted;

determine whether the permission rules are satisfied and that the requestor has permission to access the contact information; and responsive to satisfying the permission rules, transmit the contact information to the requestor.

12. The system of claim 11, comprising a user device for capturing the image of the user and transmitting the image to the controller.

13. The system of claim 12, wherein the user device updates an address book with the contact information.

14. The system of claim 11, comprising a social network application for generating a social graph that includes a relationship between the requestor and the user and wherein the permission rules include a requirement that the requestor and the user satisfy a predetermined relationship on the social graph.

15. The system of claim 14, wherein the social network application is stored on a different server than the image parser and the controller.

16. The system of claim 11, wherein the image parser identifies facial features in the image, compares the facial features in the image to facial features of account holders and identifies users based on similarity of facial features.

17. The system of claim 11, comprising a metadata engine that is coupled to the controller, the metadata engine for identifying account holders that are within a pre-determined proximity of the location of the image, generating a list of the account holders for displaying to the requestor; and receiving an identification of the user from the requestor.

18. The system of claim 11, wherein the parser receives an identification of the user from the requestor to identify the user in the image.

19. The system of claim 12, wherein the user device generates metadata for the captured image, the metadata including at least one of the location of the image, a context of the image, a time of capturing the image and an audio sample at the time of capturing the image.

20. The system of claim 11, wherein the contact information includes at least one of a name, an email address, a phone number, a home address, a work address, a uniform resource locator profile, a link to establish a relationship with the user on a social network application and an instant messaging handle.

21. A computer program product comprising a non-transitory computer readable medium including a computer readable program, wherein the computer readable program when executed on a computer causes the computer to:

receive from a requestor an image of at least one user, the image associated with a location;

identify the user in the image based on features in the image and the location associated with the image;

retrieve permission rules associated with the identified user, the permission rules indicating a predetermined threshold of proximity between a location of the user and a location of the requestor to be satisfied before the contact information is transmitted;

determine whether the permission rules are satisfied and that the requestor has permission to access the contact information; and responsive to satisfying the permission rules, transmit the contact information to the requestor.

* * * * *